F. H. PAGE.
DETACHABLE POWER UNIT FOR AIRCRAFT.
APPLICATION FILED MAY 12, 1919.
1,317,591.
Patented Sept. 30, 1919.
2 SHEETS—SHEET 2.
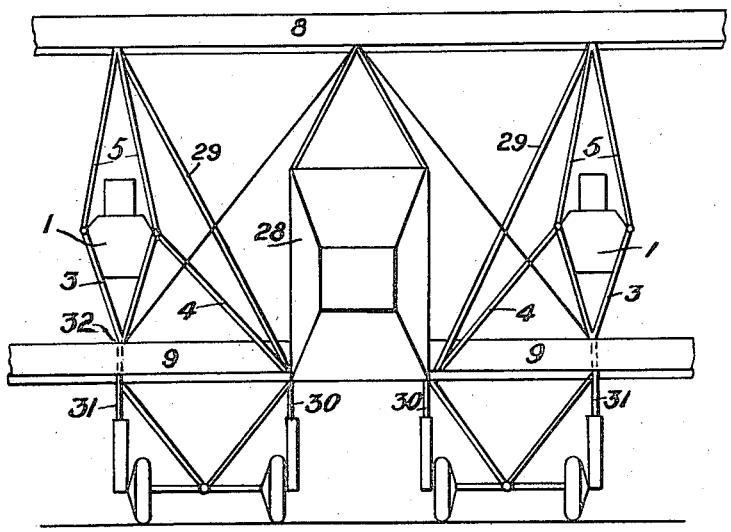

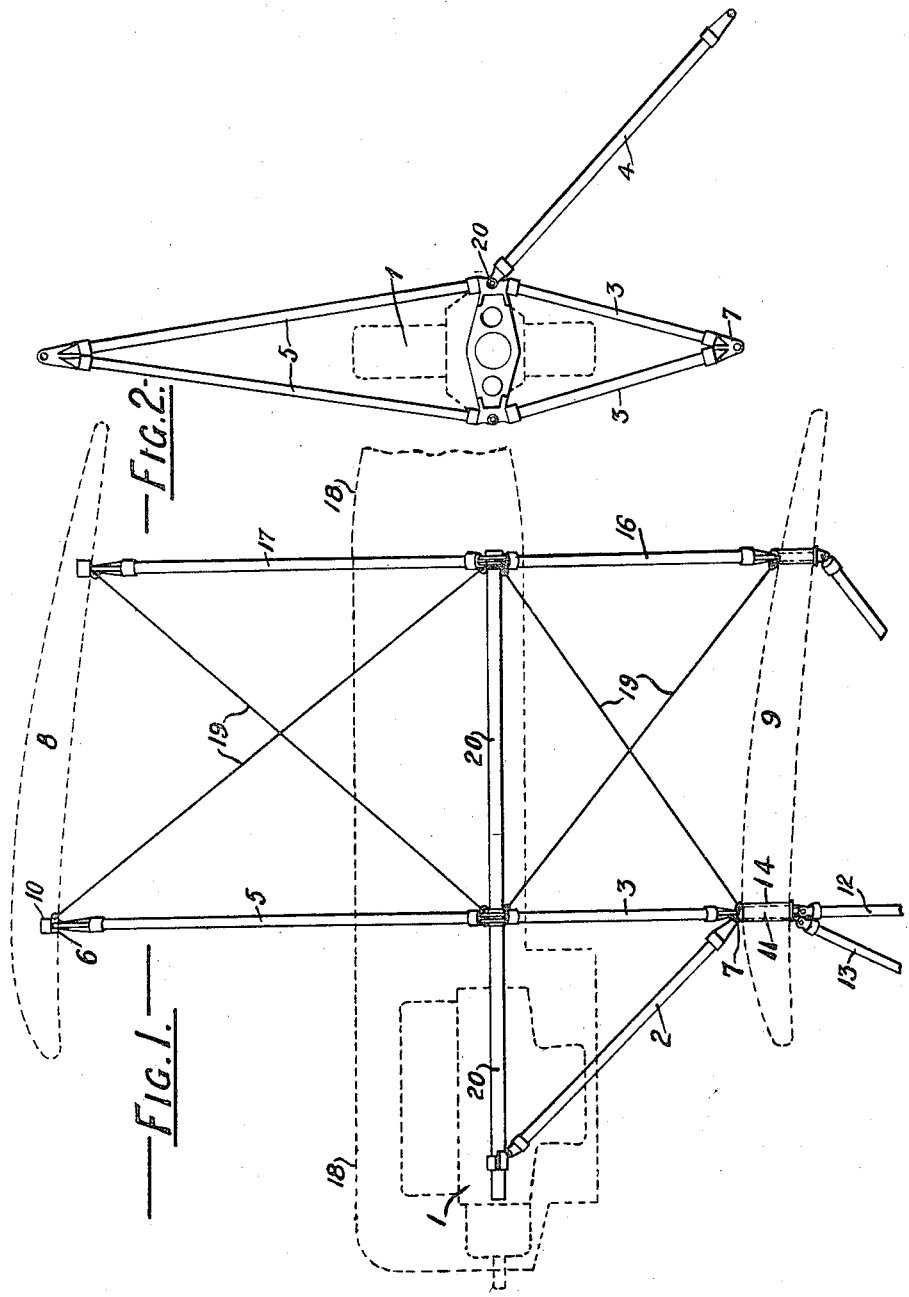

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

DETACHABLE POWER UNIT FOR AIRCRAFT.

1,317,591.  Specification of Letters Patent.  Patented Sept. 30, 1919.

Application filed May 12, 1919. Serial No. 296,611.

*To all whom it may concern:*

Be it known that I, FREDERICK HANDLEY PAGE, a subject of the King of Great Britain, residing at London, England, have invented certain new and useful Improvements in Detachable Power Units for Aircraft, of which the following is a specification.

This invention relates to improvements in aircraft.

According to the present invention the engine or engines, with, if desired, the fuel tank or the like elements are mounted in a cradle to be detachable as a unit from the aircraft structure.

In a preferred form of construction the cradle is formed of a plurality of struts arranged in diamond form to inclose the engine and having detachable connections with the aircraft structure at its apices.

The invention is more particularly described with reference to the accompanying drawings in which:—

Figure 1 is a diagrammatic side elevation of part of an aeroplane showing the method of support of an engine between a pair of wings.

Fig. 2 is a corresponding front view.

Fig. 3 is a front elevation of an aeroplane on a smaller scale.

The engine 1 is carried upon one or more pairs of struts 2, 3, 4, 5, and 29 the struts 3, 3, 5, 5, inclosing a diamond shaped space within which the engine is carried so that the top and bottom joints 6, 7, respectively form the points of support. These top and bottom joints in the arrangement taken by way of example are connected with the top and bottom wings 8 and 9 respectively. The top wing 8 is provided with a socket 10 connecting with the main spar, while the bottom joint is received by a corresponding socket 11 in the lower wing 9. The socket 11 is in the form of a spindle passing freely through the wing 9 and connected to the struts 12, 13, of the landing chassis so that shocks on this latter will not be transmitted to the wing 9 but will be absorbed by the weight of the engine 1 and its like parts carried by the structure 2, 3, 5. Where the wings are connected to the fuselage or to stub planes extending from the fuselage by means of joints of a swiveling type, the top socket 10 will engage into the hollow portion of the swiveling hinge for the top wing 8, while the bottom socket will be arranged as a member 11 passing completely through the hollow hinge pin 14 thereafter being connected to the landing gear 12, 13. In the arrangement where an engine is disposed on each side of the fuselage it is preferred to provide further struts 4 connected to the diamond shaped structures 3, 5 carrying the engine, and 16, 17 carrying the fuel tank or the like heavy parts which are all arranged preferably in the stream-line structure 18. It is obvious that in certain constructions where, for instance, an engine will be disposed in the main body carrying the pilot, the body itself will form the stream-line structure 18. The whole load of the structure 18 is carried by pairs of struts 3, 5, 16, 17, arranged in diamond form braced by wires 19 in usual manner. These struts are connected at the central angles by longitudinals 20 carrying the engine. An additional support in the form of two struts 2 disposed in a V will be provided connected to the outer ends of the longitudinals 20.

The engine 1 in tandem with fuel and oil tanks and the like parts, including such additional loads as it may be desired to carry, is arranged as a single unit attached only to the wings of the aeroplane at a few points such as 7 and 10 and consequently can be detached as a unit and a similar unit substituted therefor without disturbing the disposition of the wings or other parts and with a minimum of labor in assembling.

The above method of supporting the engine in the frames between the wings lends itself very readily to direct support of the weight of the engine on the landing chassis as will be seen with reference to Fig. 3. In this view the fuselage 28 has vertical struts 30, depending downward from it in the same manner as those 31 depending downward from the joint 32 below the engine, a pair of landing gears being provided each arranged between an engine and the fuselage or body.

Such arrangements of engine support and the like above described are particularly suitable for large machines where each element must be arranged to have a greater independence of the surrounding parts than is usual with small machines, that is to say each element must itself be a rigid and selfcontained structure and not rely for its strength upon other parts. Consequently, as above seen, in the present arrangement the engine and landing chassis are arranged to be independent of the main wings.

What I claim as my invention and desire to secure by Letters Patent is:—

1. In an aircraft having planes, a cradle adapted to support an engine with its auxiliaries, said cradle comprising a skeleton strut of diamond form with apices at top and bottom, means for detachably securing said top apices to the upper plane and means for detachably securing said bottom apices independently of the plane structure directly to a landing gear below.

2. In an aircraft having planes, a cradle adapted to support an engine with its auxiliaries, said cradle being formed of longitudinal members interconnected by struts at right angles thereto in diamond form having apices at their top and bottom, means for detachably connecting said upper apices to the frame of the plane and means for detachably connecting said lower apices independently of the plane structure directly to a landing gear below it substantially as specified.

3. In an aircraft, a cradle as claimed in claim 2 in which the upper apices have connections entering sockets in the upper supporting plane of the aircraft while the lower apices have connections which pass, with a slight degree of freedom, through the lower supporting plane of the aircraft substantially as described.

4. In an aeroplane, having upper and lower wings, said lower wings being provided with socket passages, an engine, diamond shaped frames carrying said engine, the upper apices of the diamond shaped frames being detachably connected to the upper wing and the lower apices carrying connections which pass with a slight degree of freedom through said sockets in the lower wing and directly connect to the undercarriage.

5. In an aeroplane, having upper and lower wings, said lower wings being provided with socket passages, an engine, diamond shaped frames carrying said engine the upper apices of said diamond shaped frames being detachably connected to the upper wing, the lower apices carrying connections passing through said sockets in the lower wing and in direct connection with the undercarriage, longitudinal struts attached to the central angles, and struts connected to said longitudinal struts and to the members passing through the lower wings and directly connected to the undercarriage.

In witness whereof I have hereunto set my hand in the presence of two witnesses.

FREDERICK HANDLEY PAGE.

Witnesses:
 GRIFFITH BREWER,
 CYRIL GRIFFITH BREWER.